2,973,352

METHOD OF SHREDDING AND AGING ALKALI-CELLULOSE

Friedrich Hildebrandt, Kassel-Bettenhausen, Germany, assignor to Spinnfaser Aktiengesellschaft, Kassel-Bettenhausen, Germany No Drawing. Filed June 26, 1956, Ser. No. 593,815

Claims priority, application Germany June 29, 1955

4 Claims. (Cl. 260—233)

This invention relates to an improved method of shredding and pre-ripening or aging alkali-cellulose after steeping and prior to sulfidization in the production of regenerated cellulose by the viscose process.

In the manufacture of regenerated cellulose of rayon, often called artificial silk or cellulose wool, by the viscose process, an alkali-cellulose material is prepared by alkalization of a cellulose pulp with caustic soda in a step known as steeping or mercerizing in which cellulose is reacted with caustic soda, i.e., sodium hydroxide, followed by pressing for recovery of the excess caustic soda. After this steeping process, the alkali-cellulose, usually in the form of soft sheets, is subjected to shredding to reduce it to small crumbs. After shredding, the alkali-cellulose is aged or pre-ripened, during which oxidation takes place with a certain amount of degradation and depolymerization. Then, after a suitable period of aging, the material is reacted with carbon disulfide for sulfidization or xanthogenation in order to produce a cellulose xanthate from which a viscose solution is prepared and ripened for spinning of the rayon filament. The present invention is particularly concerned with those steps of the viscose process which include the shredding and aging of the alkali-cellulose.

It is known that the physical and chemical characteristics of the alkali-cellulose is a determining factor not only for the quality of the viscose spinning solution but also for the textile properties of the threads, fibers or filaments. The manner in which sulfidization or xanthogenation progresses and the relative solubility of the cellulose xanthate depend on the quantity and distribution of the caustic soda in the alkali-cellulose. The proportion of short-chain cellulose molecules in the alkali-cellulose affects the strength and durability of the finished rayon fiber, a greater proportion of short-chain molecules resulting in a weaker fiber.

According to prior processes, the shredding takes place for a relatively short time, usually about one hour and not more than about two to three hours. Subsequently, the shredded material is stored in a container for aging or pre-ripening at the same temperature as in the shredder or at a slightly higher temperature. Aging proceeds more rapidly at a higher temperature but also results in a harsh degradation or depolymerization of the alkali-cellulose with a corresponding increase of short-chain molecules. For this reason, the shredding and aging is generally carried out at low room temperatures with a correspondingly long period of time for aging to obtain a gentle decomposition. However, these conditions necessitate considerable space and equipment for the shredding and aging steps of the process.

The degree of shredding is ordinarily determined by the weight per liter of the alkali-cellulose crumbs. This factor indicates whether the alkali-cellulose is shredded in a mechanically satisfactory manner. After a shredding time up to about one hour, a good degree of shredding has generally been considered to be obtained. For example, a value of about 150 grams per liter of the alkali-cellulose crumbs has been considered satisfactory.

It has been customary to age the alkali-cellulose at 22° C. for about 2½ days. More recent processes have been operated at a temperature of 28° C. to 30° C. with a reduction in aging time to about 45–50 hours, the proportion of short-chain cellulose molecules increasing, however, at this raised temperature. The completion of the aging is usually determined by the degree of polymerization, i.e., the number of glucose residues in a cellulose molecule, this number falling from about 800 to 300 in the process of aging.

One process has become known as a rapid aging process in which the pressed alkali-cellulose is placed in a shredder heated to about 50° C. and kneaded at this temperature for about one hour. Subsequently, the alkali-cellulose is shredded for about four hours, during which time the temperature is continuously lowered to about room temperature. The degree or intensification of shredding is increased continuously and approximately proportionately to the drop in temperature. The shredding and aging are thus combined in a single step which requires about four hours, after which sulfidization is immediately carried out. The operation according to this process is very sensitive and difficult to regulate, a very careful control of temperature and other physical conditions being required to obtain the proper continuous temperature change.

One object of the present invention is to provide an improved method of shredding and aging alkali-cellulose which is easily controlled and regulated in its operation.

Another object of the invention is to provide an improved method of shredding and aging alkali-cellulose which will improve the quality of the viscose spinning solution, particularly its filtration properties, and will also result in rayon threads with better textile properties.

Still another object of the invention is to provide an improved method of shredding and aging alkali-cellulose in which the time for shredding and aging is reduced without increasing the proportion of short-chain cellulose molecules.

Yet another object of the invention is to provide an improved method of shredding and aging alkali-cellulose which results in a more homogeneous alkali-cellulose, thereby permitting a more uniform product to be obtained when using cellulose from different sources.

Another object of the invention is to produce a shredded and aged alkali-cellulose for which less carbon disulfide is required in a subsequent sulfidization step.

These and other objects and advantages of the invention will become more apparent hereinafter.

In accordance with the invention, it has now been found that an improved method of shredding and aging alkali-cellulose after steeping and prior to sulfidization in the production of regenerated cellulose by the viscose process is obtained by initially shredding the steeped alkali-cellulose at an elevated or superatmospheric temperature for from about one half to three hours, cooling the initially shredded alkali-cellulose to room temperature for aging, and then aging the alkali-cellulose while it is maintained at room temperature and concurrently further shredding the alkali-cellulose for at least seven hours. The alkali-cellulose is preferably initially shredded at an elevated temperature of from about 30° C. to 35° C. and is then cooled to room temperature, preferably corresponding to a lower temperature of from about 19° C. to 21° C., for aging and further shredding.

The extent to which the alkali-cellulose is aged is readily determined according to known methods. The process of the invention contemplates an aging time of from 25 to 40 hours, the exact time depending upon the desired polymerization degree. The period of time during which the alkali-cellulose is shredded is extended beyond the usual period of about one hour, as is preferred for the initial shredding, and is carried out for at least an additional seven hours during aging. According to a preferred process of the invention, the elevated temperature required for initial shredding is provided solely by the frictional energy and reaction heat which probably results from an additional reaction between the caustic soda and cellulose. After the extended shredding, aging is completed by storage of the alkali-cellulose in a suitable container, preferably with a movement, agitation or mixing of the alkali-cellulose for greater uniformity.

The result obtained by an extension of the shredding time is also obtained from an intensification or increased degree of shredding which can be accomplished, for example, by increasing the speed of rotation of the shredding blades and/or by addition of a suitable finely divided grinding material such as titanium dioxide to the alkali-cellulose. Where the shredding is not intensified, a period of time required for shredding concurrently with aging is preferably at least ten hours, and even with an intensified shredding a period of at least seven hours is preferred. However, it is advantageous to thus intensify the shredding in order to decrease the total time required for shredding and aging. A more intensive shredding also results in the improvement of the qualities of the viscose solution made from the alkali-cellulose, particularly in the filtration properties of the viscose solution.

The initial shredding step is preferably carried out such that the weight per liter of alkali-cellulose is about 150 grams per liter. The time required for normal shredding is about one to three hours, while with the addition of a grinding material or otherwise intensifying the shredding, the time required is about one half to two hours.

The extended shredding with aging is preferably sufficient to give a value of from about 135 to 140 grams per liter of the alkali-cellulose. Normal shredding requires at least ten hours to obtain this degree of shredding during aging whereas an intensive shredding requires at least seven hours.

The following example further illustrates the invention but the invention is not intended to be limited thereby.

*Example*

A quantity of alkali-cellulose in the form of soft sheets from an immersion or steeping press is placed into an efficient shredding machine and shredded at temperatures from 30° ot 35° C. for one hour, the increased temperature of the alki-cellulose during this initial shredding being obtained without the addition of heat by the use of frictional energy and reaction heat. The alkali-cellulose is then immediately cooled to a lower temperature of about 20° C., in a vacuum if necessary, and at this temperature aging is begun and shredding is continued during the aging process for ten hours. The aging is then completed after a total of 35 hours at 20° C.

It was found that an increase of the initial shredding temperature to 30° C. to 35° C. with a subsequent immediate lowering of the aging temperature to about 20° C. instead of the usual 28° C. to 30° C. results in a reduction of the proportion of short-chain cellulose molecules and a consequent improvement in the strength and quality of the rayon fibers. Another advantage of the process was the surprising fact that the aging time is shortened and the sulfidization following aging can be started at a lower temperature.

Furthermore, with a shredding time of about ten hours, the filtration constants of the unfiltered viscose solution prepared from the alkali-cellulose are more than 100% better than the filtration constants obtained when employing an alkali-cellulose shredded for only one hour. In fact, these filtration constants are in a range which otherwise have previously been obtained only with a filtered viscose solution. In addition, sulfidization or xanthogenation can be carried out with about 20% less carbon disulfide consumption than has been normally required.

The extended shredding time in the process of the invention shortens the individual fibers of the original alkali-cellulose sheets and increases the swelling properties of these fibers. Not only is the alkali-cellulose mechanically homogenized by the longer shredding period, but it is also believed that a chemical homogenization occurs under alkali exchange. This homogenization is particularly advantageous in obtaining a uniform product as well as aiding in the improved qualities of the viscose solution.

In comparison with the "rapid aging" process noted above, the method of shredding and aging according to this invention is much more easily and accurately controlled since there is a rapid transition from the elevated temperature in the initial shredding step to a constant lower temperature for the subsequent aging and additional shredding step. Thus, it is possible to maintain definite conditions of decomposition or degradation of the alkali-cellulose during aging and an exact control of the viscosities.

The invention is hereby claimed as follows:

1. An improved method of shredding and aging alkali-cellulose after steeping and pressing and prior to sulfidization in the production of regenerated cellulose by the viscose process which comprises: initially shredding the steeped and pressed alkali-cellulose at an elevated temperature of about 30° C. to 35° C. for from about one half to three hours; cooling said initially shredded alkali-cellulose to room temperature for aging; and then aging said alkali-cellulose while maintaining said room temperature and concurrently further shredding said alkali-cellulose for at least seven to about ten hours.

2. An improved method of shredding and aging alkali-cellulose after steeping and pressing and prior to sulfidization in the production of regenerated cellulose by the viscose process which comprises: initially shredding the steeped and pressed alkali-cellulose at an elevated temperate of about 30° C. to 35° C. for from about one half to three hours; cooling said alkali-cellulose to a lower temperature of from about 19° C. to 21° C. for aging; and then aging said alkali-cellulose while maintaining said lower temperature and concurrently further shredding said alkali-cellulose for at least seven to about ten hours.

3. An improved process as defined in claim 2 wherein a more intensive shredding is employed to decrease the time required for said initial shredding to within a range of about one-half to two hours.

4. An improved process as defined in claim 2 wherein a more intensive shredding is employed to decrease the time required for shredding during concurrent aging at said lower temperature to a period of about but not less than seven hours.

References Cited in the file of this patent

UNITED STATES PATENTS

| | | |
|---|---|---|
| 2,143,857 | Britton et al. | Jan. 17, 1939 |
| 2,490,097 | Seaman et al. | Dec. 6, 1949 |
| 2,521,450 | Costa | Sept. 5, 1950 |
| 2,592,746 | Samuelson | Apr. 15, 1952 |
| 2,735,846 | Richter | Feb. 21, 1956 |